(No Model.) 2 Sheets—Sheet 1.

M. J. WIGHTMAN.
ELECTRIC SYSTEM.

No. 546,724. Patented Sept. 24, 1895.

WITNESSES:
E. M. Bolsinger
C. F. Kress Jr.

INVENTOR
Merle J. Wightman
BY
Ward Raymond
ATTORNEY.

UNITED STATES PATENT OFFICE.

MERLE J. WIGHTMAN, OF JOHNSTOWN, PENNSYLVANIA.

ELECTRIC SYSTEM.

SPECIFICATION forming part of Letters Patent No. 546,724, dated September 24, 1895.

Application filed April 3, 1895. Serial No. 544,267. (No model.)

*To all whom it may concern:*

Be it known that I, MERLE J. WIGHTMAN, of Johnstown, county of Cambria, State of Pennsylvania, have invented a new and useful Improvement in Electrical Systems, of which the following specification is a true and exact description, due reference being had to the accompanying drawings.

My invention relates to certain improvements in the method of and apparatus for obtaining variable electromotive force, and has for its object to provide a machine whereby such electromotive force may be generated in a simple and efficient manner.

In general my invention consists in a dynamo-electric machine having a plurality of separately controlled magnetic fields and an armature-operating in said fields, which armature is of the multi-circuit type—that is to say, the armature does not operate electrically as a unit, but different portions of it are utilized for the passage of different currents. In some instances I may pass an electric current through a portion of it, which portion will then operate as a motor to drive the whole armature, and I can then generate a current in another portion; or the armature may be operated by extraneous means and the several fields used to generate separate currents therein in the portions acted upon by them; or I may pass current through a portion or portions of the armature-coupling, such portions in series or multiple to vary the counter electromotive force, and thus the speed of rotation of such armature.

Figure 1:
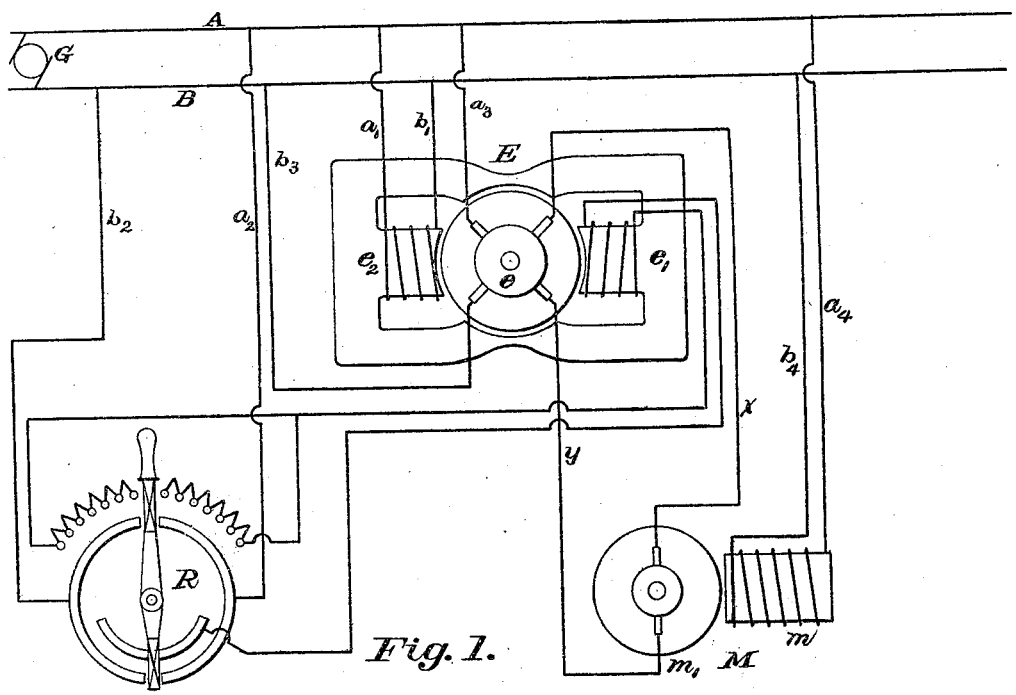
Figure 2:
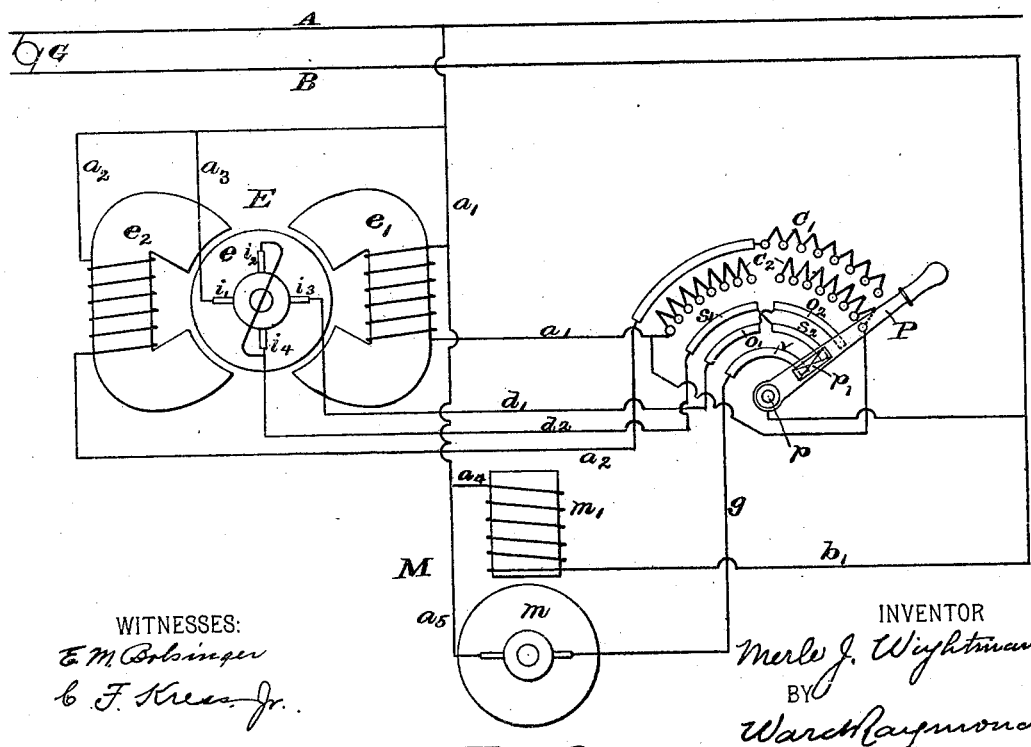
Figure 3:
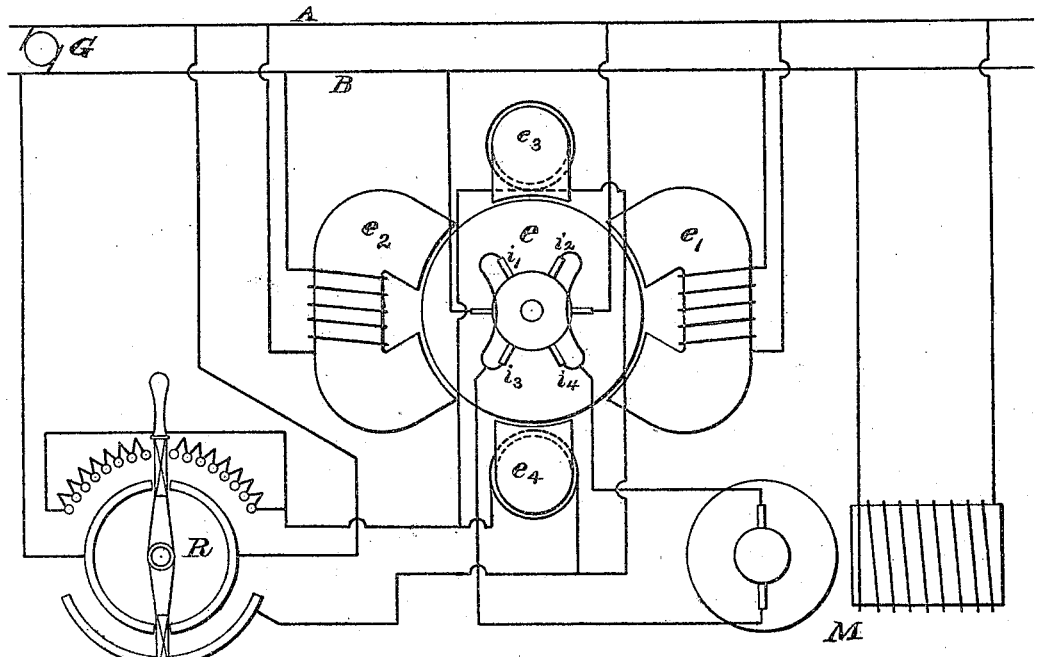
Figure 4:
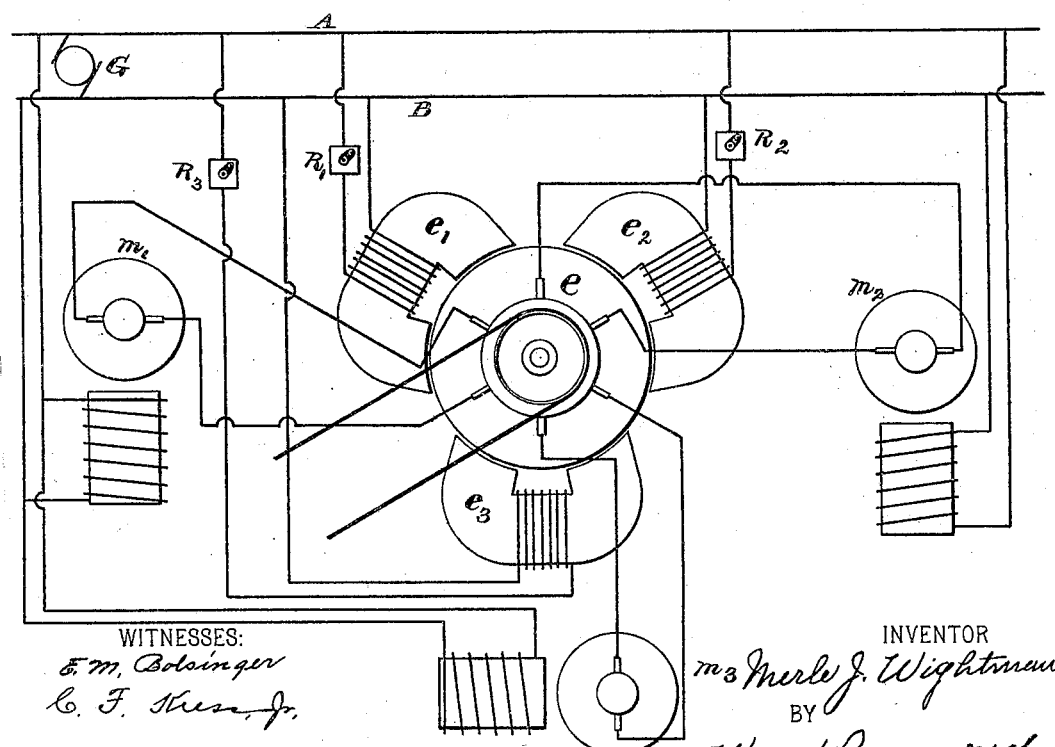

In the drawings, in which I have shown several types of machines embodying my invention, Figure 1 shows a machine in which one field is constant, and a current passing through that part of the armature operates as a motor, while the opposite fields generate a separate current in the portion of the armature acted upon by them. In Fig. 2 is shown a machine in which both fields are variable and the armature connected up in a manner I will later describe. In Fig. 3 is a machine designed so that the centrifugal pull of the fields on the armature shall be always balanced, and in Fig. 4 is a machine the armature of which is operated by extraneous means and the several magnetic fields are employed to generate separate currents in the armature.

I will now describe the several figures in detail. In Fig. 1, G is a source of constant potential supplying the main conductors A B. M is any translating device, here shown as a motor having the field $m$ and armature $m'$. E is a secondary electrical machine having the field-coils $e'$ $e^2$ and armature $e$. The field-coil $e^2$ is energized directly from the conductors A B by connections $a'$ $b'$, and is therefore of constant strength, while coils $e'$ are energized by conductors $a^2$ $b^2$, which pass through the reversing-controller R, so that the strength and polarity of field $e'$ may be controlled. Referring to the armature, that portion acted upon by field $e^3$ is charged by a current of constant potential through connections $a^3$ $b^3$, while that portion acted upon by field $e'$ is connected in series with armature $m'$ of motor M by connections X and Y. The field $m$ of motor M is energized by current from conductors A B through $a^4$ $b^4$, and is therefore of constant strength.

The operation of the machine is as follows: The field $e^2$ and that portion of the armature included between conductors $a^3$ $b^3$, being charged by a current of constant potential, operates as a motor and the armature revolves at a constant speed. Now, if we excite field $e'$ a current will be set up in that portion of the armature controlled by that field and which is included in the circuit of conductors X and Y. This current will pass through armature $m'$ of motor M, and as the field $m$ is energized the motor will operate. As the potential of a current generated in an armature is controlled by the strength of the field in which it operates, we may govern the current supplied to armature $m'$ by varying the strength of field $e'$. This is done by means of controller R. The speed of a motor being governed by the potential of the current supplied to the armature, it will be seen that by controlling the current supplied to field $e'$ we govern the current generated in armature $e$, and consequently the speed of armature $m'$. In Fig. 2 the secondary machine E is somewhat different from that shown in Fig. 1, both fields $e'$ and $e^2$ being controlled.

The winding and connections are as follows: The windings $a'$ and $a^2$ of fields $e'$ and $e^2$ are connected at one end to conductor A and at the other end terminate in the resistance-coils $c'$ and $c^2$. The brush $i'$ at the neutral point of armature $e$ in field $e^2$ is connected with line A by conductor $a^3$, while the lead $d'$ from the brush $i^3$ at the neutral point of field $e'$ terminates in contact-bars $o'$ and $o^2$. The brushes $i^2$ and $i^4$ at the neutral point between fields $e'$ and $e^2$ are connected by lead $d^2$ to contact-bar $s'$ $s^2$.

The motor M is connected as follows: The field $m'$ is connected directly with conductors A B by $a^4$ $b'$, while one terminal of the armature is connected to line A by $a^5$ and the other to contact-bar V by lead $g$. Pivoted at $p$ is the movable contact-bar P, which is adapted to engage contacts $o^2$, $s'$, $c^2$, and $c'$ and which is in direct electrical connection with conductors B. $p'$ is a contact insulated from bar P and adapted to connect contact V with either $o'$ or $s^2$.

The machine operates as follows: As the contact-bar P is shown in the drawings, the circuit embracing the field $e^2$ is open between the bar and resistance $c'$, and consequently the field is not energized. The circuit including field $e'$ is closed, however, and as all of resistance $c^2$ is out the maximum current is flowing through the circuit and the fields $e'$ at their maximum strength. The brushes $i'$ and $i^3$ being connected with conductors A and B the current flows through the armature between them, and as the armature-current passes within the magnetic field $e'$ of the armature the two acting upon each other causes the armature to revolve. The circuit in which is the motor-armature $m$ is as follows: from brush $i'$ through $a^3$, $a'$, and $a^5$ into the armature $m$, through it into conductor $g$, into contact-bar V, thence along $p'$ to $s^2$ and $s'$, and along $d^2$ to the armature at brushes $i^2$ and $i^4$. As when the field $e'$ is fully charged the field $e^2$ is zero and no current is generated in the armature between brushes $i'$ and $i^2$ and $i^4$, the motor and armature $m$ will not be energized. Now, as contact-bar P moves toward the left the resistance $c'$ of field $e^2$ will be cut out and the strength of the field raised, while at the same time the resistance $c^2$ is increased and field $e'$ weakened. The excitation of field $e^2$ causes an electromotive force to be generated in that portion of armature $e$ affected by it, and since field $e'$ decreases as $e^2$ increases the counter electromotive force of armature $e$ remains constant, and therefore its speed. The development of an electromotive force in that portion of the armature $e$ affected by field $e^2$ causes a flow of current through the circuit embracing armature $m$, which flow increases as the strength of field $e^2$ is increased and $e'$ decreased. When field $e'$ becomes zero, the potential between brushes $i^2$ and $i^4$ and $i^3$ is practically that upon the line and armature $m$ receives the full potential of line A B.

In order to raise the potential in the circuit embracing armature $m$ above that of conductors A B, I provide for the movement of contact-bar P, so arranged that the resistance $c^2$ shall diminish, and I so arrange contacts $s'$ and $o'$ that brush $i^3$ shall be connected with motor-armature $m$ and brushes $i^2$ and $i^4$ with conductor B instead of vice versa, as before. The field $e^2$ is now at its maximum strength and operates the armature, while the field $e'$ acts upon the current flowing through the armature between brushes $i^3$ and $i^2$ and $i^4$, which is now the current supplied to armature $m$ and raises its potential more or less, according to the strength of field $e'$. I thus provide in a single machine means for obtaining an electromotive force of a higher potential than at present in the line from which it draws its energy.

In Fig. 3 the armature $e$ is operated at a constant speed by the constant fields $e'$ and $e^2$, while the fields $e^3$ and $e^4$ are controlled by the controller R, as heretofore described. The current supplied by this portion of armature $e$ is taken off by brushes $i'$, $i^2$, $i^3$, and $i^4$ and supplied to armature $m$, as shown. It will be seen that the current supplied to this armature may be varied at will by varying the fields $e^3$ and $e^4$, and it will also be seen that if I vary the two fields alike the centrifugal pull upon the armature will be balanced and a gain in the bearings of the armature obtained.

In Fig. 4 I have shown the armature $e$ driven by belt $h$, operated by suitable power. (Not shown.) This armature has around it the separate fields $e'$, $e^2$, and $e^3$, all separately controlled by controllers R', R², and R³ and the currents generated in the respective portions of the armature governed by them supplied to motor-armatures $m'$, $m^2$, and $m^3$. In this manner one large machine may be adapted to supply a number of individual circuits of different potential.

It will be understood that I do not limit myself to the exact constructions or systems of wiring herein shown, but may employ many arrangements, as will be well understood by those skilled in the art to which my invention appertains.

Having thus described my invention, what I claim, and desire to protect by Letters Patent, is—

1. In combination with a source of current supply and a translating device, an electrical device having a single armature and a plurality of fields, independent connection from the source of current supply to the fields, a connection from the source of current supply to the portion of armature controlled by one field, said connection being separate from the connection to the fields and a connection between the portion of the armature controlled by another field and the translating device.

2. In combination with a source of current supply and a translating device, an electrical device having a single armature and a plurality of pairs of fields, the members of each pair being at opposite sides of the armature, independent connection from the source of current supply to the pairs of fields, a connection from the source of current supply to the portion of armature controlled by one set of pairs of fields, said connection being separate from the connection to the fields and a connection between the portion of the armature controlled by another set of pairs of fields and the translating device.

3. In combination with a source of current supply and a translating device, an electrical device having a single armature and a plurality of fields, independent connection from the source of current supply to the fields, a connection from the source of current supply to the portion of armature controlled by one field, and a connection between the portion of the armature controlled by another set of fields and the translating device, and means to vary the strength of current to the field controlling the portion of the armature in electrical connection with the translating device.

4. In combination with a source of current supply and a translating device, an electrical device having a single armature and a plurality of pairs of fields, the members of each pair being at opposite sides of the armature, independent connection from the source of current supply to the pairs of fields, a connection from the source of current supply to the portion of armature controlled by one set of pairs of fields and a connection between the portion of the armature controlled by another set of pairs of fields and the translating device, means to vary the strength of the current in the field controlling the portion of the armature in electrical connection with the translating device.

5. In combination with a source of current supply and a translating device, an electrical device having a single armature and a plurality of fields, independent connection from the source of current supply to the fields, electrical circuits, one adapted to connect the source of current supply and the portion of the armature controlled by one field, and the other to connect the portion of the armature controlled by the other field and the translating device, a switch device adapted to reverse the portions of the armature to which said circuits are connected.

6. In combination with a source of current supply and a translating device, an electrical device having a single armature and a plurality of fields, independent connections from the source of current supply to the fields, electrical circuits, one adapted to connect the source of current supply and the portion of the armature controlled by one field, and the other to connect the portion of the armature controlled by the other field and the translating device, a switch device adapted to reverse the portions of the armature to which said circuits are connected, one field controlling a greater portion of the armature than the other field.

7. In combination with a source of current supply and a translating device, of an electrical device having a single armature and a plurality of fields, independent connection from the source of current supply to the fields, electrical circuits, one adapted to connect the source of current supply and the portion of the armature controlled by one field, and the other to connect the portion of the armature controlled by the other field and the translating device, a switch device adapted to reverse the portions of the armature to which said circuits are connected, one field controlling a greater portion of the armature than the other field, and means to vary the current strength in the fields, the arrangement being such that the current strength is first decreased in the motor field and increased in the generator field when the generator field is the field controlling the smaller portion of the armature, and the current strength increased in the motor field when the generator field is the field controlling the larger portion of the armature.

8. An electrical machine consisting essentially of a single armature, a plurality of fields, a source of current supply and independent connection from the source of current supply and each of the fields and independent connection from the portion of the armature controlled by each field and a translating device.

9. An electrical machine consisting essentially of a single armature, a plurality of fields, a source of current supply and independent connection from the source of current supply and each of the fields and independent connection from the portion of the armature controlled by each field and a translating device, and means to independently vary the strength of the current in each of the fields.

In testimony whereof I have affixed my signature in presence of two witnesses.

MERLE J. WIGHTMAN.

Witnesses:
 DAVID S. DUNCAN.
 I. E. ROBERTS.